Figure 1:
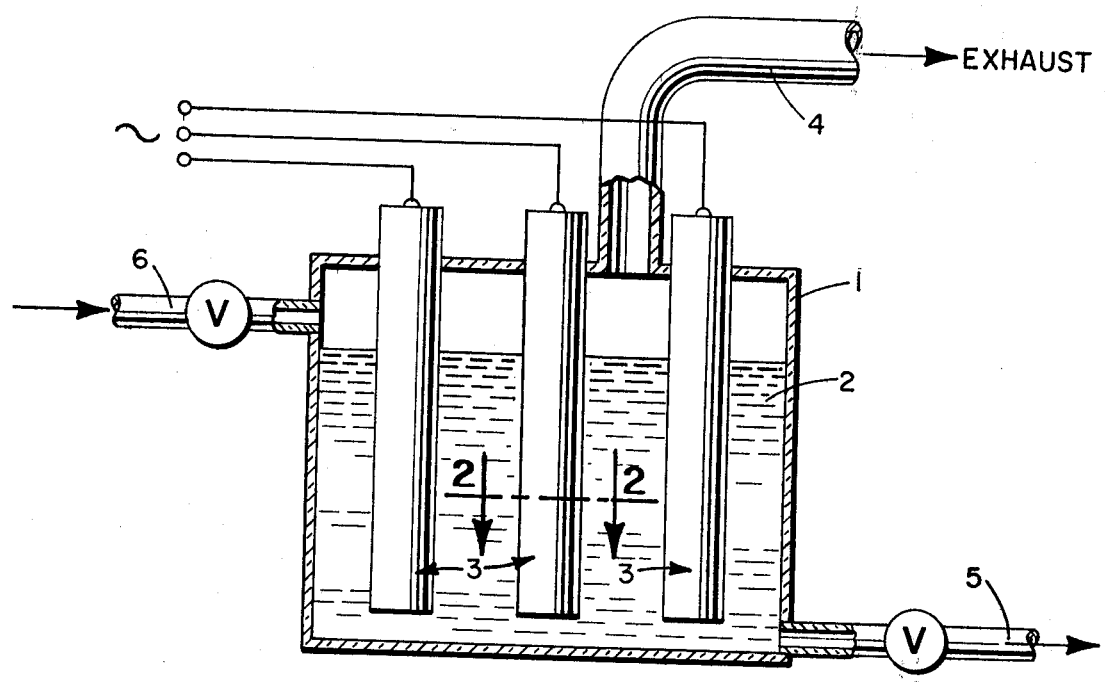

United States Patent [19]

Petersson et al.

[11] 4,251,715
[45] Feb. 17, 1981

[54] METHOD FOR DIRECTLY HEATING CONCENTRATED SULFURIC ACID BY ELECTRIC CURRENT FLOW BETWEEN SURFACE-PASSIVATED ELECTRODES

[75] Inventors: Stig A. Petersson; Allan F. Norrö, both of Skelleftehamn, Sweden

[73] Assignee: Boliden Aktiebolag, Stockholm, Sweden

[21] Appl. No.: 858,078

[22] Filed: Dec. 6, 1977

[51] Int. Cl.³ .......................... H05B 3/60; F22B 1/30; C01B 17/88

[52] U.S. Cl. ............................ 219/284; 159/DIG. 1; 159/DIG. 19; 204/56 R; 204/290 R; 204/292; 219/275; 219/288; 423/531

[58] Field of Search ................. 219/284–295, 219/271–276; 204/56 R, 58, 280–289, 290 R, 293; 423/531; 159/DIG. 19, DIG. 1

[56] References Cited

U.S. PATENT DOCUMENTS

| | | | |
|---|---|---|---|
| 1,419,008 | 6/1922 | Baum | 159/DIG. 19 |
| 1,441,610 | 1/1923 | Topp | 219/290 |
| 1,507,120 | 9/1924 | Keep et al. | 219/284 X |
| 1,610,751 | 12/1928 | Dantsizen | 219/284 |
| 1,685,210 | 9/1928 | Baum | 219/284 X |
| 1,782,482 | 11/1930 | Siefert et al. | 219/288 |
| 2,871,424 | 1/1959 | Aikman | 204/56 R |
| 3,317,415 | 5/1967 | Delahunt | 204/286 X |
| 3,664,929 | 5/1972 | White et al. | 219/284 X |

FOREIGN PATENT DOCUMENTS 119549  3/1945  Australia ................... 219/288

Primary Examiner—A. Bartis
Attorney, Agent, or Firm—Stevens, Davis, Miller & Mosher

[57] ABSTRACT

A method is provided for directly heating a concentrated sulphuric-acid solution by passing alternating electric current between surface-passivated electrodes immersed in the solution and by using electrodes of iron or an iron alloy having a low resistance iron or iron alloy inner core covered by an outer high resistance passivating surface layer which are so surface-passivated that the transition resistance between the electrodes and the concentrated sulphuric-acid solution is at least as great as the resistance exerted by the concentrated sulphuric-acid solution.

9 Claims, 1 Drawing Figure

U.S. Patent      Feb. 17, 1981      4,251,715

METHOD FOR DIRECTLY HEATING CONCENTRATED SULFURIC ACID BY ELECTRIC CURRENT FLOW BETWEEN SURFACE-PASSIVATED ELECTRODES

The present invention relates to a method of directly heating sulphuric-acid solution by means of an electric current which is caused to pass between electrodes immersed in the sulphuric-acid solution.

In chemical processes in which liquids are heated, for example in the distillation of sulphuric acid to increase the concentration thereof and/or to remove therefrom impurities which have dissolved therein, heat is normally applied to the liquid indirectly, through the wall of the vessel containing the liquid by heating said wall with combustion gases, steam or electric heating elements. In this regard there is described in the German Pat. No. 357,593 a method of distilling sulphuric acid in which the acid is heated indirectly by means of combustion gases, and a similar method is described on pages 442–444 of Ullmanns Encyklopädie der technischen Chemie, 3rd Edition, 15. Band, 1964, in which method steam is used for the heating process.

Disadvantages with heating the liquid indirectly are that it requires the use of expensive apparatus and that the heat economy is poor. Although it is possible to recover to a certain extent the heat of the gases used for indirect heating by means of heat exchangers, such apparatus are both expensive to purchase and expensive to maintain.

Heat losses can be reduced by indirectly heating the liquid by means of electric heating elements, although in this case the heat transfer is not satisfactory and hence the elements heating the wall of said vessel must be of considerable dimensions, which renders such elements both expensive to purchase and expensive to maintain.

It has also been proposed to heat sulphuric acid directly by blowing combustion gases thereinto. Methods of this type are described, for example, in the German Pat. Nos. 69,216 and 229,676. Although the heat transfer is relatively good when heating directly with combustion gases, the heat economy is relatively unsatisfactory and, in many cases, results in an unacceptable, impure product. In order to improve the heat transfer and heat economy and to simplify the apparatus required. When transferring heat to liquids having good electric conductivity, a technique has been developed in which an electric current is passed through the liquid by means of electrodes. In the publication Sb. Tr. Moldykh Uch., Tomsk Politekn. Ins. issue 73, series 1 Pischulin et al have described a method of distilling an aqueous solution of sulphuric acid and hydrochloric acid for recovering the acids. Heating is effected by means of an electric current which is caused to pass through the solution via graphite electrodes.

One problem encountered with heat supplied to sulphuric acid solutions and other liquids of good electric conductivity in this manner is caused by the low voltage drop between the graphite electrodes, which results in a very high current strength through the liquid when relatively large quantities of energy are supplied. Even an apparatus having an output effect in the order of a magnitude of 100–200 kW will normally require current strengths of thousands of amperes, which means that the dimensions of electric-supply lines and transformers must be unacceptably large.

These problems can be at least substantially avoided in accordance with the present invention when heating sulphuric acid solutions, by heating said solutions directly with electrodes which are made of iron or iron alloys and the outer surface of which has been so passivated that the transition resistance between the electrodes and the sulphuric acid solution is at least equally as great as the resistance offered by the sulphuric-acid solution. In this way there is obtained a significant resistance at the boundary between the electrodes and the liquid, thereby enabling the voltage to be considerably increased and the current strength reduced to a corresponding degree, whilst maintaining the power applied. Conveniently, electrodes are used which have been so surface-passivated that said transition resistance is of the order of magnitude of 3–5 times the resistance exerted by the sulphuric-acid solution, thereby enabling large quantities of energy to be applied to the sulphuric-acid solution per unit of time whilst using moderate current strengths.

The electrodes can be surface-passivated by surface treatment of or coating said electrodes prior to their use for heating purposes in a manner such that there is formed on the surfaces of said electrode a thin layer of material having a good resistance to acid and exhibiting a relativey high resistivity. Normally, however, the electrodes are surface-passivated in situ by means of the sulphuric-acid solution being heated. When in contact with sulphuric acid, there is namely formed a thin passivating layer on the electrodes which also protects the electrodes against corrosion, said layer, according to the composition of the electrode material and those impurities which may be present in the sulphuric acid solution, comprising substantially oxides of one or more of the substances iron, nickel, chromium, copper and silicon. The layer is formed relatively rapidly, for example in less than 4 hours, when heating 70% sulphuric acid.

Conveniently, the electrode material is iron alloyed with carbon and/or silicon. For example, when the electrodes are not required to have an excessively long life, an unalloyed or substantially un-alloyed steel, cast iron, particularly gray cast iron, or silicon iron having 2–20 percent by weight Si can be used. If a considerable length of life is required of the electrodes, however, electrode material of iron steel alloyed with one or more of the substances Ni, Cr and Cu, and optionally also with Si, are to be preferred. Suitable electrode material can be seleted within the following limits: Fe<98% by weight, Ni=0–20 percent by weight, Cr=0–5 percent by weight, Cu=0–10 percent by weight, Si=0–20 percent by weight and C=0–4 percent by weight.

Those types of alloys which fall under the category Nickel-resist have been found particularly suitable as electrode material, both from the aspect of surface passivation and resistance to corrosion, which types of alloys, in addition to iron in a quantity of approximately 67–80 percent by weight, also contain 13.5–17.5 percent by weight Ni, 1.0–2.5 percent by weight Cr, 5.5–7.5 percent by weight Cu and 1.0–2.0 percent by weight Si, and C in quantities less than 3.0 percent by weight.

Figure 2:
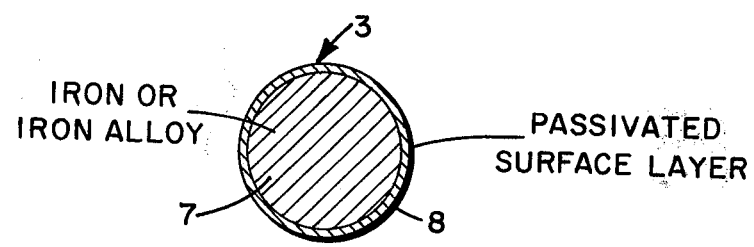

FIG. 1 is a vertical cross-sectional view of a distillation vessel with electrodes; and FIG. 2 is a cross-sectional view of FIG. 1 taken along lines 2—2.

In one embodiment representative of the method of the invention, a 70% sulphuric acid contaminated with sulphates of mainly iron, nickel, copper and aluminium was continuously purified by distilling the acid at 310° C. in a quartz-glass vessel 1. The acid was composed of an electrolyte 2 used in a copper-electrolysis process, which electrolyte had been freed of the major part of its copper and nickel content, and recirculated residual acid and washing liquor from separation and washing stages arranged downstream of the distillation vessel 1. The heat required for the distillation was supplied through three electrodes 3 each having an iron or iron alloy core 7 and a passivated surface layer 8. The electrodes were immersed in the sulphuric acid, said electrodes being supplied with a 50-periodic cycle 3-phase alternating current whose voltage could be varied. A 66% sulphuric acid solution was driven from the vessel at 4 and an approximately 96% residual acid was removed at 5 in the proportions 5.7 to 1, the residual acid containing the aforementioned contaminants. The contaminants were separated from the residual acid by cooling said acid to approximately 20° C., the salts which crystallized out from the acid being washed with clean water and recovered. The residual acid freed from salts and the washing liquor were returned to the distillation vessel together with freshly-supplied de-copperized electrolyte at 6. The electrode material was Nickel resist, the electrodes, which were placed in a row, being arranged at a central distance of approximately 200 mm and having a diameter of 35 mm. Tests were also made using graphite electrodes, which were also arranged at a central distance of approximately 200 mm, but had a diameter of 38 mm.

When varying the voltage of the respective electrodes comprising Nickelresist and graphite, the current strength and powers given in the following table were obtained.

| Electrode material | diam. (mm) | volt | amp. | kW |
|---|---|---|---|---|
| Graphite | 38 | 14 | 400 | 9.7 |
| Graphite | 38 | 23 | 700 | 28 |
| Nickelresist | 35 | 20 | 100 | 3.5 |
| Nickelresist | 35 | 104 | 400 | 72 |

It will be understood from the results shown in the table, that the current strength can be considerably reduced when electrodes comprising, for example Nickelresist are used whose surfaces have been pre-passivated or become passivated in the sulphuric acid.

We claim:

1. A method for directly heating a concentrated sulphuric-acid solution by means of electric current passed between surface-passivated electrodes of iron or iron alloys having a low resistance iron or iron alloy inner core covered by an outer high resistance passivating surface layer comprising immersing said electrodes in said concentrated sulphuric-acid solution, passing alternating current between the electrodes through said inner low resistance part of the electrodes and through said outer high resistance part of the electrodes, said electrodes being so surface-passivated that a transition resistance between the electrodes and the concentrated sulphuric-acid solution is obtained which is at least as great as a resistance exerted by said concentrated sulphuric-acid solution.

2. A method according to claim 1, wherein there are used electrodes so surface-passivated that said transition resistance is of the order of magnitude of 3–5 times the resistance exerted by the sulphuric-acid solution.

3. A method according to claim 1, wherein there are used electrodes which have been pre-passivated by surface treatment of the electrodes or coating the outer surfaces thereof.

4. A method according to claim 1, wherein the electrodes are surface-passivated in situ, by the action thereon of the sulphuric-acid solution during the heating of said solution.

5. A method according to claim 1, wherein there are used electrodes comprising substantially iron which has been alloyed with at least one of the elements carbon and silicon.

6. A method according to claim 1, wherein there are used electrodes which comprise substantially iron alloyed with at least one of the elements nickel, chromium and copper.

7. A method according to claim 1, wherein there is used an electrode material comprising substantially iron alloyed with at least one of the elements carbon, silicon, nickel, chromium and copper, said material having the following composition:
Fe = <98 percent by weight
Ni = 0–20 percent by weight
Cr = 0–5 percent by weight
Cu = 0–10 percent by weight
Si = 0–20 percent by weight
C = 0–0.4 percent by weight.

8. A method according to claim 7, wherein there is used an electrode material of substantially the following composition:
Fe = 67–80 percent by weight
Ni = 13.5–17.5 percent by weight
Cr = 1.0–2.5 percent by weight
Cu = 5.5–7.5 percent by weight
Si = 1.0–2.8 percent by weight
C = <3.0 percent by weight.

9. A method according to claim 1 wherein said solution is 70% sulphuric acid.

* * * * *